United States Patent
Metcalfe et al.

(10) Patent No.: US 7,627,188 B2
(45) Date of Patent: Dec. 1, 2009

(54) ERROR DIFFUSION METHOD AND HARDWARE ARCHITECTURE

(75) Inventors: David Jon Metcalfe, Marion, NY (US); Zhenhuan Wen, Rochester, NY (US); Robert Paul Robideau, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/274,842

(22) Filed: Nov. 20, 2008

(65) Prior Publication Data

US 2009/0073496 A1     Mar. 19, 2009

Related U.S. Application Data

(63) Continuation of application No. 11/172,151, filed on Jun. 30, 2005, now Pat. No. 7,460,727.

(51) Int. Cl.
*G06K 9/36* (2006.01)

(52) U.S. Cl. .................................................... 382/252

(58) Field of Classification Search ................. 382/237, 382/251–252, 254, 270, 274; 358/3.03, 3.05, 358/3.22, 3.23, 448, 465–466, 515, 518, 358/530, 534
See application file for complete search history.

(56) References Cited

U.S. PATENT DOCUMENTS

| | | |
|---|---|---|
| 5,226,094 A | 7/1993 | Eschbach |
| 5,353,127 A | 10/1994 | Shiau et al. |
| 5,374,997 A | 12/1994 | Eschbach |
| 5,535,019 A | 7/1996 | Eschbach |
| 5,565,994 A | 10/1996 | Eschbach |
| 5,748,785 A | 5/1998 | Mantell et al. |
| 5,784,496 A | 7/1998 | Mantell |
| 5,875,249 A | 2/1999 | Mintzer et al. |
| 6,325,487 B1 | 12/2001 | Mantell |
| 6,962,400 B2 | 11/2005 | Minnebo et al. |
| 7,084,903 B2 | 8/2006 | Narayanaswami et al. |
| 7,181,087 B2 | 2/2007 | Kang et al |
| 7,460,727 B2 * | 12/2008 | Metcalfe et al. ............. 382/252 |

OTHER PUBLICATIONS

Robert W. Floyd et al., "An Adaptive Algorithm for Spatial Greyscale", 3 pp., 1976.

* cited by examiner

*Primary Examiner*—Jose L Couso
(74) *Attorney, Agent, or Firm*—Pepper Hamilton LLP

(57) ABSTRACT

A system and method for performing threshold stamping are disclosed. First and second threshold values corresponding to first and second pixels may be retrieved from a threshold memory. A plurality of upscaled threshold values may optionally be computed based on the first threshold value and the second threshold value. An (upscaled) threshold value may be updated at each of one or more first register blocks. A binary pixel value may be computed based at least in part on the first updated threshold value. The first updated threshold value may be updated at each of one or more second register blocks. A downscaled threshold value may optionally be computed based on a plurality of second updated threshold values. The downscaled threshold value or second updated threshold value may be damped in a damping circuit, and the damped threshold value may be stored in the threshold memory.

8 Claims, 14 Drawing Sheets

1/4 Scanline Threshold Buffer

ERROR DIFFUSION METHOD AND HARDWARE ARCHITECTURE

CROSS-REFERENCE TO RELATED APPLICATION

This application claims priority to and is a continuation application of U.S. patent application Ser. No. 11/172,151, filed Jun. 30, 2005 now U.S. Pat. No. 7,460,727, and entitled "Error Diffusion Method And Hardware Architecture." The above-identified application is incorporated by reference herein, in its entirety, for all purposes.

TECHNICAL FIELD

The disclosed embodiments generally relate to the field of image processing.

BACKGROUND

Error diffusion methods, such as the method described in R. W. Floyd & L. Steinberg, "An Adaptive Algorithm for Spatial Grayscale," in the Proceedings of the Society for Information Display, vol. 17, pp 75-77 (1976) (the "Floyd-Steinberg method"), are often used to convert grayscale images to binary images on a binary output device. Such error diffusion methods typically examine a pixel in an input image, determine whether the intensity for the pixel in the input image exceeds a threshold, and assign either a light or dark binary value to the pixel in an output image based on whether it exceeds the threshold. The difference between the input image pixel intensity and the corresponding pixel intensity in the output image is the error for the pixel. Error diffusion methods assign at least a portion of the error to one or more neighboring pixels that have not been previously assigned a pixel intensity for the output image. In this manner, the total pixel intensity is substantially maintained throughout the output image without a substantial loss of resolution. However, individual pixels might be lighter or darker in the resulting image than in the input image.

For example, FIG. 1A depicts grayscale values for neighboring pixels in an input image. Each pixel has a grayscale value within a range. In a computer embodiment having 8-bit color, a low value for the range is "0" and a high value for the range is "255."

FIG. 1B depicts the resulting light/dark values for the four pixels based on a traditional error diffusion method. In FIG. 1B, the threshold for the light/dark determination is the midpoint of the range (i.e., a grayscale value of 127.5). Since the first pixel has a grayscale value greater than the threshold, the pixel is assigned a value of "1" (e.g., "light" or "white"). The difference between the original grayscale value for the first pixel and the resulting high value is defined to be the error value, $E_1$. In other words, the error is equal to the amount of compensation added to a pixel in order to force it to a "0" or "1" value.

For the second pixel, the error value $E_1$ is subtracted from the original value for the pixel. Since the resulting value is less than the threshold, the second pixel is assigned a value of "0" (e.g., "dark"). The error value, $E_2$, is computed for the second pixel. The process iterates over each subsequent pixel until all pixels are computed. Alternate error diffusion methods might diffuse the calculated error among a plurality of unconverted pixels. For example, a first portion of the error value $E_1$ for the first pixel could be subtracted from the second pixel and a second portion could be subtracted from the third pixel.

Exemplary methods of using error diffusion to generate an output image include the methods described in U.S. Pat. Nos. 5,226,094 and 5,374,997 to Eschbach, the disclosures of which are each incorporated herein by reference in their entireties.

One problem inherent in the Floyd-Steinberg method is that displeasing textures (i.e., worms) are produced in the highlight and shadow regions. An exemplary error diffusion rendered binary output having worm effects is shown in FIG. 2.

Accordingly, modifications to the Floyd-Steinberg method, such as the one described in U.S. Pat. No. 5,353,127 to Shiau et al., which is incorporated herein by reference in its entirety, and shown in FIG. 3, have been developed to reduce this effect. The error diffusion weights (the "Shiau-Fan" or "anti-worm" coefficients) shown in FIG. 3 may be generated using simple bit-shifting techniques. As such, this error diffusion method allows for very fast calculations with limited circuitry.

A third error diffusion method, called "threshold stamping" and described in U.S. Pat. No. 5,535,019 to Eschbach, which is incorporated herein by reference in its entirety, modulates the error diffusion threshold level in order to adjust the dot placement in the extreme highlight and shadow regions. As such, the worm artifact is virtually eliminated. The stamping function requires a complete line-buffer of memory to store and adjust the slow-scan threshold video that is used to render the downstream pixels via error diffusion processing.

FIG. 4 depicts a block diagram of the main components of a traditional error diffusion color image-processing module with threshold stamping. Each error diffusion block 405a-d performs the threshold stamping and error diffusion algorithms for a particular color, such as cyan, magenta, yellow and black.

The error diffusion blocks 405a-d receive pixel information 410a-d corresponding to the color for each pixel on a scanline. The pixel information 410a-d is within a range, such as from 0 to 255, and represents the intensity of the particular color for the pixel in an input image.

The error diffusion blocks 405a-d also receive error information from the error scanline buffer memory 415a-d corresponding to the same color. Each error value is within a range, such as from −128 to 127, and represents the amount of error passed to the pixel from preceding pixels according to an error diffusion algorithm.

Moreover, the error diffusion blocks 405a-d receive threshold information from the threshold scanline buffer memory 420a-d corresponding to the same color. Each threshold value is within a range, such as from −128 to 127, and represents the change from the base threshold for the particular pixel.

The error diffusion blocks 405a-d determine whether the sum of the pixel value and the error value for a pixel is greater than the sum of the base threshold and the threshold value for the pixel. If the sum of the pixel value and the error value is greater, then the pixel is supplied with the designated color 425a-d. Otherwise, the pixel is not supplied with the designated color.

The error diffusion blocks 405a-d then compute updated error values based on the above comparison for a scanline and store the updated error values in the error scanline buffer memory 415a-d corresponding to the same color. Likewise, the error diffusion blocks 405a-d compute updated threshold values based on the above comparison for a scanline and store the updated threshold values in the error scanline buffer memory 420a-d corresponding to the same color. Accordingly, slow-scan error and threshold information is passed from preceding scanlines to subsequent scanlines using this process.

FIG. 5 depicts a traditional threshold stamping distribution profile that is added to the threshold buffer memory after stamping a "black" (or "dark" pixel). The magnitude of the threshold adjustment is typically largest at the central point ($T_N$) of pixel binarization and decays to zero several pixels away (for example, $T_{N+12}$ and $T_{N-12}$). As such, this has the desired effect of pushing subsequent printed dot(s) away from a printed dot while still maintaining the overall binary output level. The overall result of this processing shifts the dot placement of surrounding downstream pixels in the opposite direction of the "worm" response. As a result, a visually pleasing and uniform binary output is delivered. The distribution shown in FIG. 5 represents the effects of one stamped pixel. If multiple pixels are stamped, the threshold scanline buffer memory includes the sum of the threshold adjustments of each stamped pixel.

FIG. 6A depicts an error diffusion rendered binary image using threshold stamping. As stated above the rendered binary image is devoid of the "worm" artifacts present in FIG. 2. FIG. 6B depicts an error diffusion threshold delta image. The dark areas correspond to areas in which the threshold delta value is greater than zero for a highlight region. If the location is darker, then the threshold delta value is higher for that location. The slow-scan "decay" of the threshold delta is essential to rendering a pleasing binary output dot structure since it is desired that any threshold adjustment only affect the dot-placement of localized "neighboring" pixels while leaving other areas unaffected. The stamping applied in FIG. 6A directly correlates to the location and magnitude of the threshold stamping profile in FIG. 6B. For example, the arrows in FIGS. 6A and 6B indicate the correspondence between two such pixels/thresholds.

Although threshold stamping produces excellent image quality with pleasing dot structures, it requires numerous computations to achieve the desired output rendering effect. Accordingly, the overall throughput performance of the algorithm is limited and could not typically be used for high-speed image processing applications.

FIG. 7 depicts a single-port synchronous memory storing a scanline of threshold data performing a read-modify-write access. The single-port synchronous memory is a typical memory structure used in an ASIC to store a scanline of data for image processing context information. However, threshold stamping requires numerous computations per pixel in order to alter the threshold level(s) around the pixel being "stamped." In a typical implementation, as many as 25 "read/modify/write" operations are performed in a single system clock cycle. In this case, any threshold adjustment is limited by the single-port memory architecture (i.e., one address and data bus). Accordingly, at least 2 memory clock cycles are required to perform a "read/modify/write" operation. Although dual- and triple-port memories are available that would reduce the access time by one-half and one-third, respectively, such memories are more complex and consume much more silicon real estate than single-port memories.

As shown in FIG. 7, one solution includes a phase-lock-loop (PLL) to increase the clock rate in order to successively/serially retrieve and modify the buffer's threshold data within one system clock cycle. However, this technique becomes impractical for any high-speed application since the RAM clock frequency would have to be increased by 50× over the system clock rate (25 operations×2 cycles/operation). For a 75 MHz system clock, the resulting memory clock frequency is 3.75 GHz. In other words, for a high-speed application, the memory clock speed would result in a prohibitively expensive memory solution.

What is needed is an error diffusion method and system that enables high-speed error diffusion while performing threshold stamping.

A need exists for an error diffusion method and system that reduces the worm effects traditionally caused in highlight and shadow regions of an image.

A further need exists for a method of reducing the memory size and number of memory accesses for an error diffusion algorithm while substantially maintaining image quality.

The present disclosure is directed to solving one or more of the above-listed problems.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "pixel" is a reference to one or more pixels and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, a system for performing threshold stamping may include a threshold memory including a plurality of threshold values, an error memory including a plurality of error values, a register array including a plurality of register blocks, and a threshold damping circuit in communication with the third register block and the threshold memory. A first register block may be in communication with the threshold memory and the error memory. A second register block may include an error diffusion block. A third register block may be in communication with the error memory and may output a stamped threshold value. The threshold damping circuit may reduce the stamped threshold value.

Optionally, in the system, each register block may include a register, a look-up table (LUT), and a multiplexer in communication with the register and the LUT. The register may outputs threshold value for a local pixel, wherein the LUT outputs a threshold delta value based on a pixel value of a pixel analyzed by the error diffusion block. The multiplexer may select either the threshold value or a sum of the threshold value and the threshold delta value to send to the next register block.

In the above-described system, the threshold damping circuit may reduce the stamped threshold value by multiplying the stamped threshold value by a constant, wherein the constant is a value from about 0 to about 1. Alternatively, threshold damping circuit may reduce the stamped threshold value by subtracting a constant from the absolute value of the stamped threshold value to determine a damped threshold value, wherein if the computed damped threshold value is less than zero, the damped threshold value equals zero.

The system may also include an upscaling circuit in communication with the threshold memory and the first register block, wherein the upscaling circuit performs linear interpolation using adjacent threshold values. The upscaling circuit may include a register that outputs a first threshold value and receives a second threshold value from the threshold memory, a subtractor that communicates with the register and determines a delta value equal to the difference between the first threshold value and the second threshold value, a divider that communicates with the subtractor and determines an interpolation factor by dividing the delta value by a scaling factor, a state machine that outputs each integer value from zero to the scaling factor minus one (inclusive, in succession), a multiplier that communicates with the divider and the state machine and calculates a product of the interpolation factor and the output of the state machine, and an adder that communicates with the multiplier and the register and outputs the sum of the product and the first threshold value to the first register block.

Further, the system may include a downscaling circuit in communication with the third register block and the threshold memory, wherein the downscaling circuit averages a plurality of stamped threshold values received from the third register. The downscaling circuit may include: a first number of registers, wherein the first number equals a scaling factor plus one, and wherein each register outputs a stamped threshold value; an averager that communicates with the registers and averages the stamped threshold values output from the registers; and a sampler that communicates with the averager and outputs a downscaled threshold value once every second number of clock cycles, wherein the second number equals the scaling factor.

In another embodiment, a method of performing threshold stamping may include retrieving a threshold value corresponding to a first pixel from a threshold memory, updating the threshold value at each of one or more register blocks, calculating a binary pixel value at an error diffusion block, damping the updated threshold value, and storing the damped threshold value in the threshold memory.

In such an embodiment, when updating the threshold value at each of one or more register blocks, the method may include, for each register block: storing the threshold value in the register block; selecting one of the threshold value and a sum of the threshold value and a threshold delta value as an updated threshold value, wherein the threshold delta value is determined based on a pixel value from the error diffusion block; and transmitting the updated threshold value to the next register block. When calculated a binary pixel value, the method may include calculating the binary pixel value based on at least an updated threshold value corresponding to the first pixel, an error value corresponding to the first pixel, and a pixel value corresponding to the first pixel. When damping the updated threshold value, the method may include setting the damped threshold value to a product of the updated threshold value and a value, wherein the value is between about 0 and about 1. Alternatively, when damping the updated threshold value, the method may include: (i) if a constant is less than the absolute value of the updated threshold value, setting the damped threshold value to a difference between the constant and the updated threshold value; and (ii) if not, setting the damped threshold value to zero.

In an embodiment, a method of performing threshold stamping may include retrieving a first threshold value corresponding to a first pixel and a second threshold value corresponding to a second pixel from a threshold memory, computing a plurality of upscaled threshold values based on the first threshold value and the second threshold value, updating an upscaled threshold value at each of one or more register blocks, computing a binary pixel value at an error diffusion block, computing a downscaled threshold value based on a plurality of updated threshold values, damping the downscaled threshold value, and storing the damped threshold value in the threshold memory.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

Figure 8:
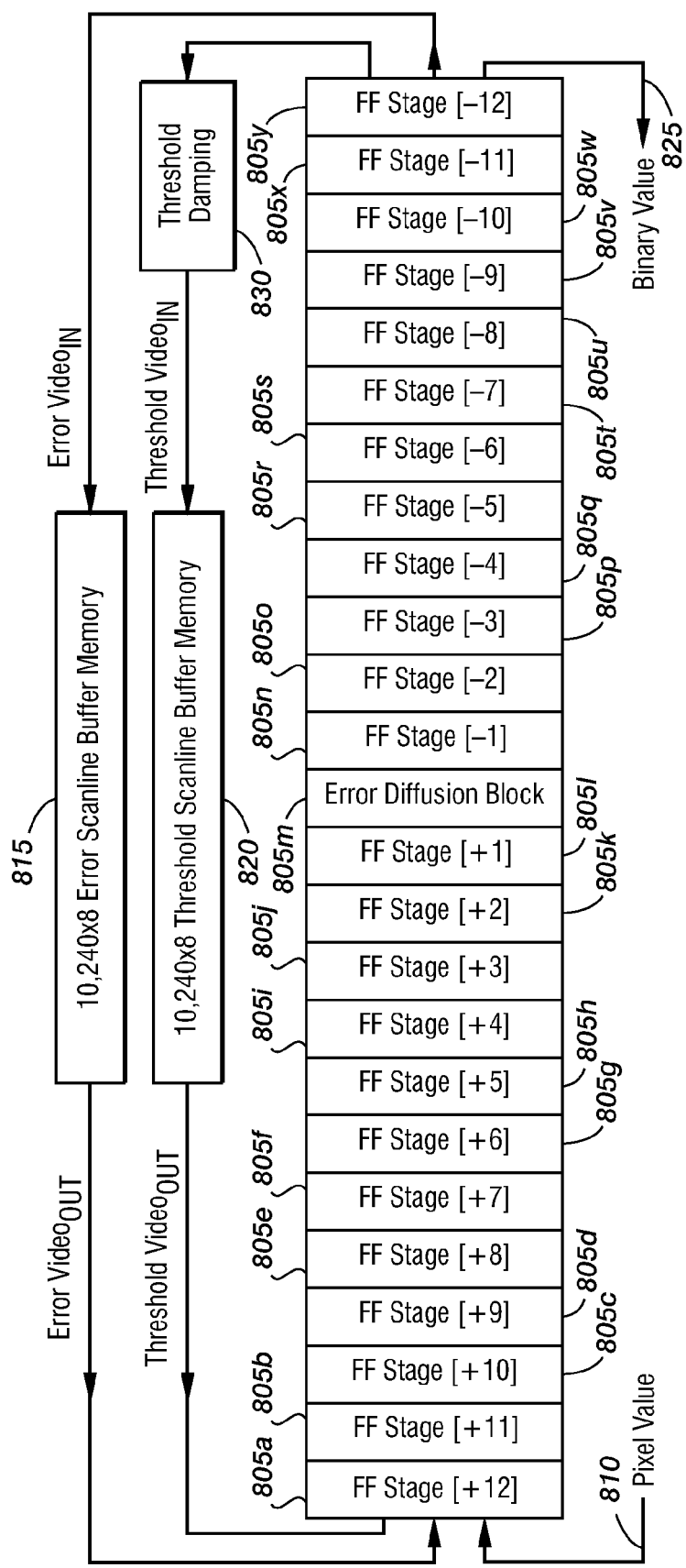
FIG. 8 depicts an exemplary error diffusion system that performs threshold stamping according to an embodiment.

FIG. 8 depicts an exemplary error diffusion system that performs threshold stamping according to an embodiment. As shown in FIG. 8, the threshold stamping function may be performed using a register array 805a-y. In an embodiment, a majority of the threshold values for a scanline may be stored within the threshold scanline buffer memory 820 at any given time. During pixel processing, threshold values may be retrieved from the threshold scanline buffer memory 820 and stored within a series of register blocks in the register array 805a-y.

Figure 7:
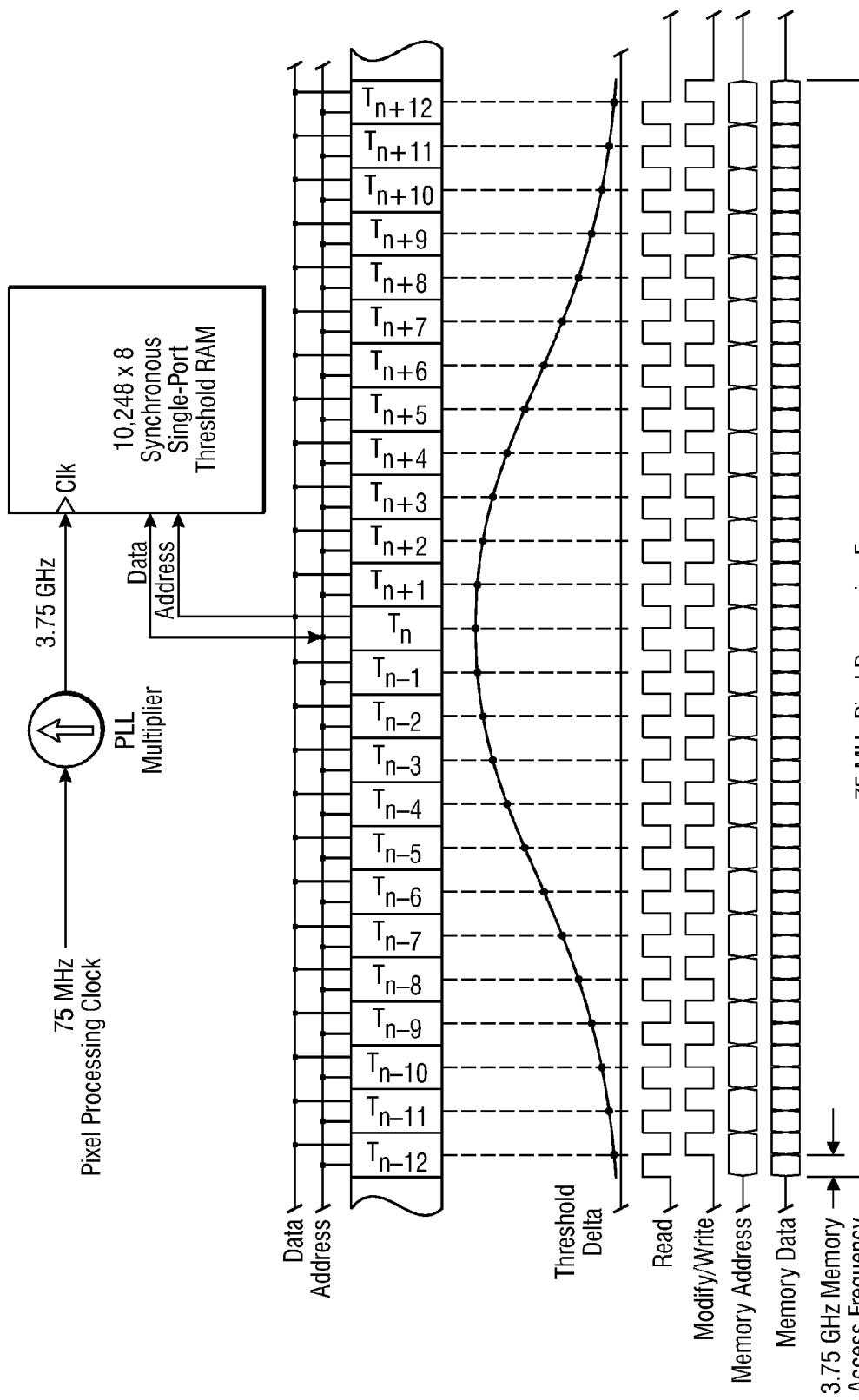
FIG. 7 depicts a single-port synchronous memory storing a scanline of threshold data performing a read-modify-write access.

The register array 805a-y may permit multiple point accessibility during the threshold computation and error diffusion processes. Such accessibility may permit high-data throughput rates while applying threshold stamping and dynamic modulation of the threshold level(s) relative to each pixel being processed. This may be in direct contrast to the synchronous single-port memory depicted in FIG. 7, which has limited access properties. The register array 805a-y may form a "rolling-buffer" architecture in which information from previous scanlines is retrieved from the error scanline buffer memory 815 and the threshold scanline buffer memory 820, modified by an error diffusion algorithm and a threshold stamping algorithm applied within the register array 805a-y, decayed via the threshold damping circuit 830, and stored within the same memory locations. As such, the threshold and error data may be updated for processing by, for example, subsequent scanlines.

The following description pertains to a single instance of an error diffusion algorithm and a threshold stamping algorithm in the register array 805a-y. The operation for each of, for example, cyan, magenta, yellow and black error diffusion algorithms and threshold stamping algorithms may function substantially similar to the described embodiment using the pixel information for each of those colors. Other, additional, or fewer colors may be used within a particular embodiment and still be within the scope of this disclosure.

In an embodiment, FF[+12] 805a may receive a pixel value 810, which may be a value within a range from, for example, 0 to 255; an error value from the error scanline buffer memory 815, which may be a value within a range from, for example, −128 to 127; and a threshold value from the threshold scanline buffer memory 820, which may be a value within a range from, for example, −128 to 127. The pixel value 810 may represent the pixel intensity of a corresponding pixel in an input image. The error value may represent the initial error assigned to the pixel according to an error diffusion algorithm. The threshold value may represent a stored threshold value for the pixel based on preceding scanlines. Each of FF[+12, . . . , −12] 805a-y may perform the functions described in reference to FIG. 9. In addition, FF[0] (i.e., the error diffusion block) 805m may perform error diffusion for a particular pixel. The particular error diffusion algorithm performed by the error diffusion block 805m may not affect the threshold computation described herein.

Figure 1A:
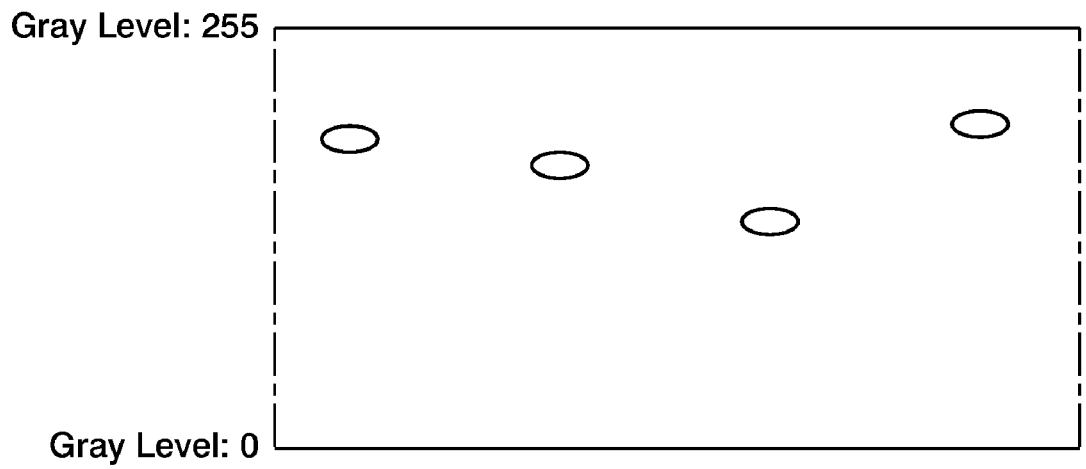
FIG. 1A depicts grayscale levels for neighboring pixels.
Figure 1B:
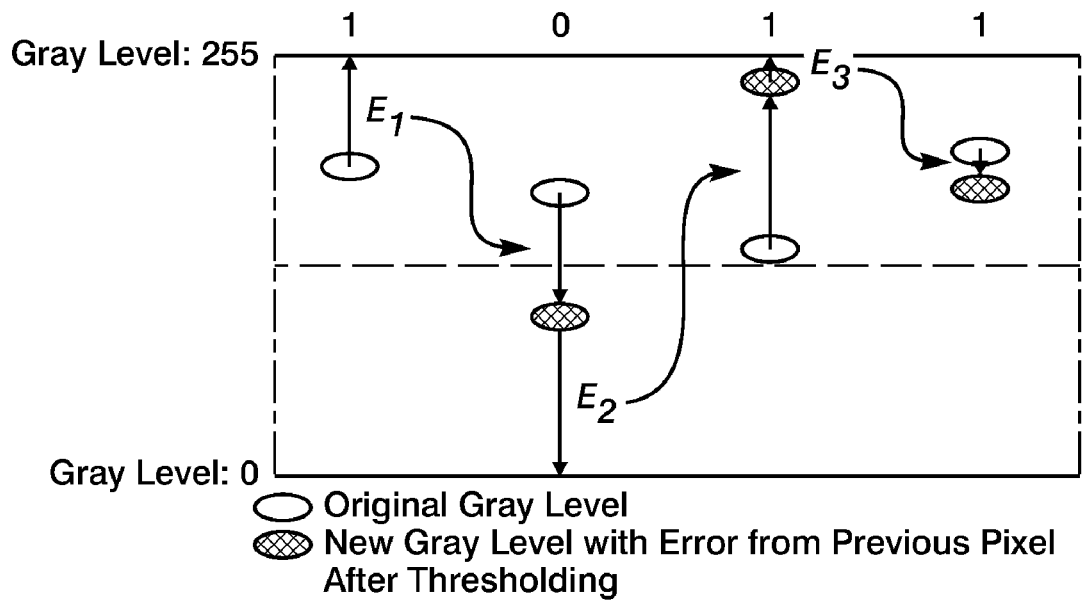
FIG. 1B depicts the resulting pixel values using a traditional method of computing error diffusion.
Figure 2:
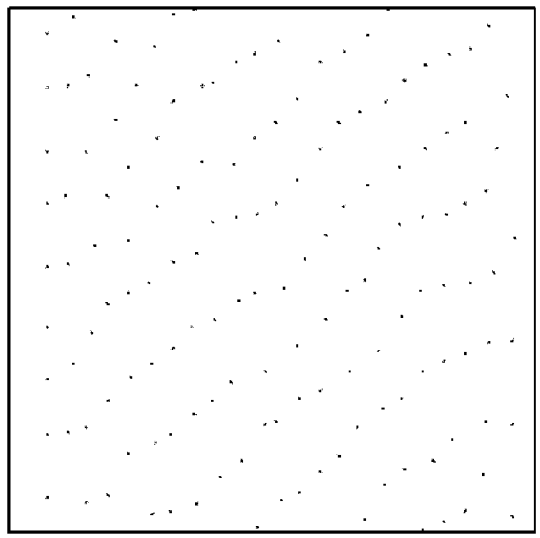
FIG. 2 depicts an exemplary error diffusion rendered binary output of a constant highlight black/K input level having worm effects.
Figure 3:
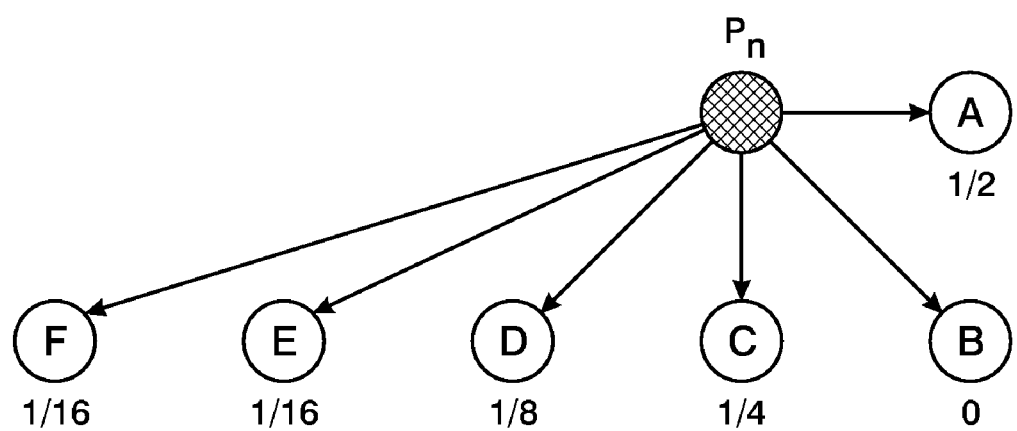
FIG. 3 depicts the error-diffusion weights and the destination pixels for a traditional method of computing error diffusion.
Figure 4:
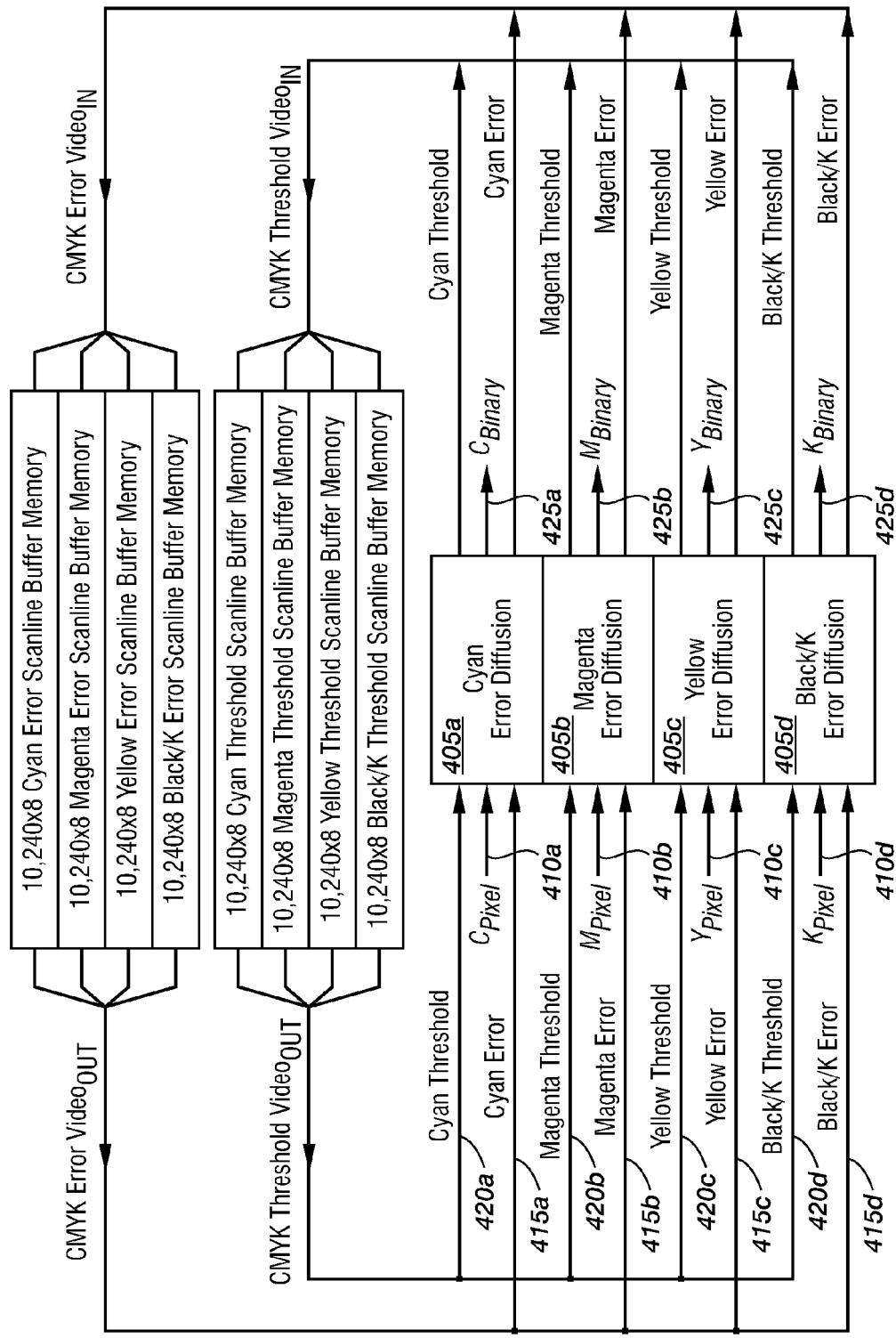
FIG. 4 depicts a block diagram of the main components of a traditional error diffusion color image-processing module with threshold stamping.
Figure 5:
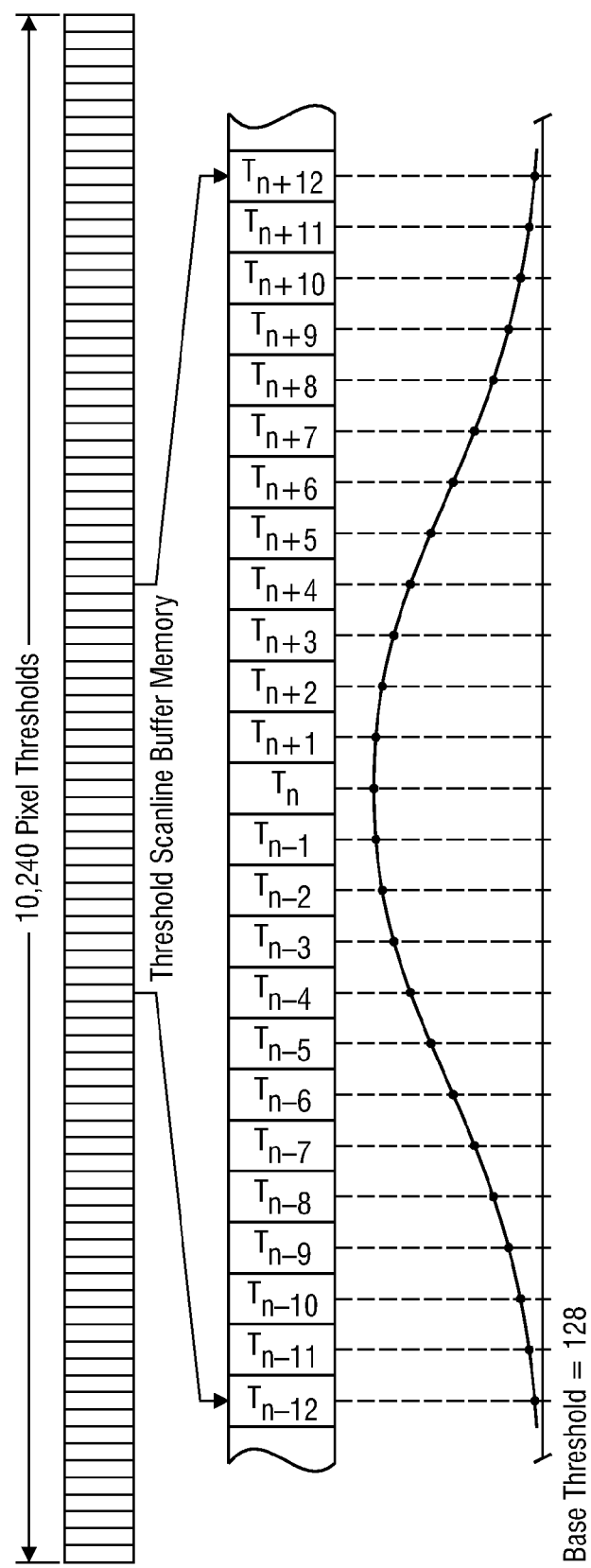
FIG. 5 depicts a traditional threshold stamping distribution profile that is added to the threshold buffer memory after stamping a "black" (or "dark" pixel).
Figure 9:
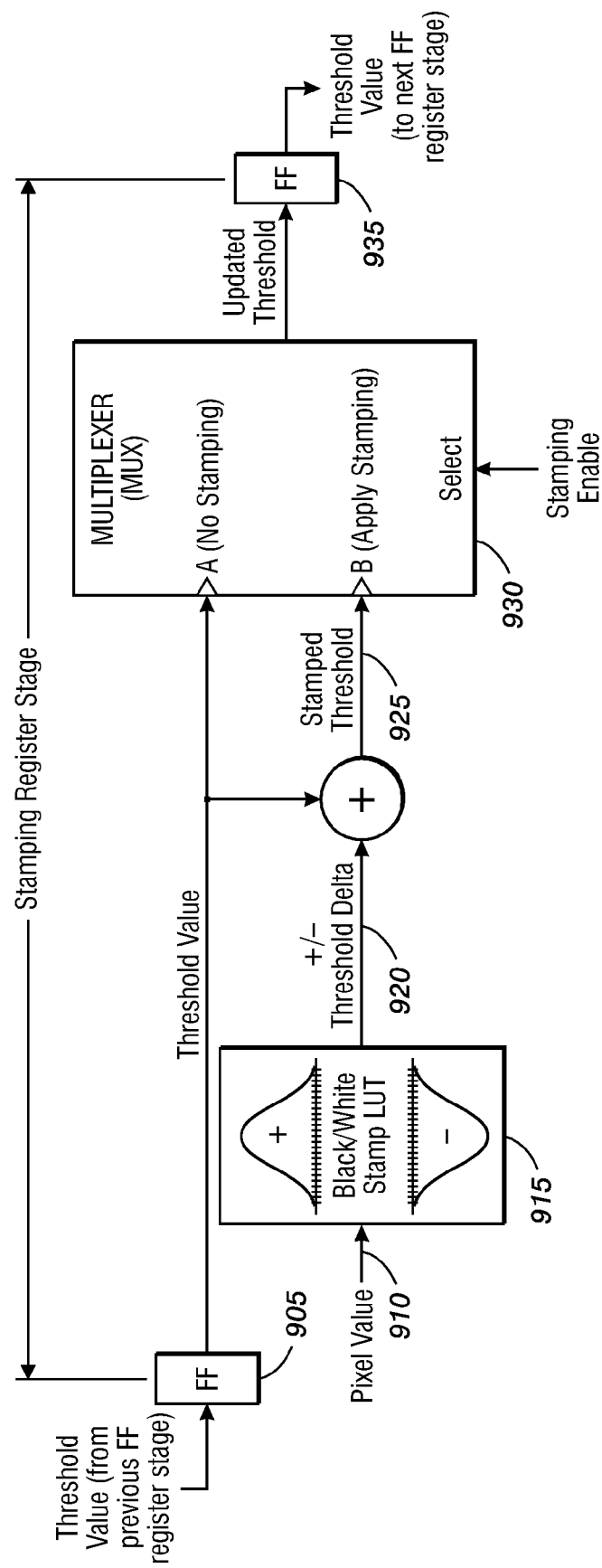
FIG. 9 depicts an exemplary register stage block diagram for performing threshold stamping according to an embodiment.

FIG. 9 depicts an exemplary register stage block diagram for performing threshold stamping according to an embodiment. As shown in FIG. 9, a register 905 may receive the threshold value for a pixel. Simultaneously, a pixel value 910 for the pixel being processed by the error diffusion block 805m may be received by a white/color stamping look up table (LUT) 915. The LUT 915 may determine a threshold delta value 920 for the local pixel based on the pixel value 910 of the pixel being processed by the error diffusion block 805m. The threshold delta value(s) 920 stored in the LUT 915 may be based at least in part on the number of register stages between the register 905 and the error diffusion block 805m. For example, the threshold delta value(s) 920 stored in the LUT 915 at FF[+1] 805l for a particular pixel value may be greater than the threshold delta value(s) stored in the LUT at FF[+12] 805a for the particular pixel value. In an embodiment, the LUT 915 may use a distribution, such as the one shown in FIG. 5, to assign threshold delta values 920 to the respective register stages. Embodiments of LUT 915 are described in reference to FIGS. 10 and 11 below.

The threshold value for the local pixel may be added to the threshold delta value 920 to generate a stamped threshold value 925. The threshold value and the stamped threshold value 925 may be input to a multiplexer 930. The multiplexer 930 may select one of the two values to forward to the next register stage 935. In an embodiment, the determination may be based upon the pixel value 910 of the pixel being processed by the error diffusion block 805m. The updated threshold information may be forwarded to the next register stage 935 for further threshold stamping during the following clock cycle. Accordingly, this architecture may allow a distinct profile to be simultaneously "stamped" at each register stage. A significant increase in the image-processing throughput speed for the stamping operation may result.

Figure 10:
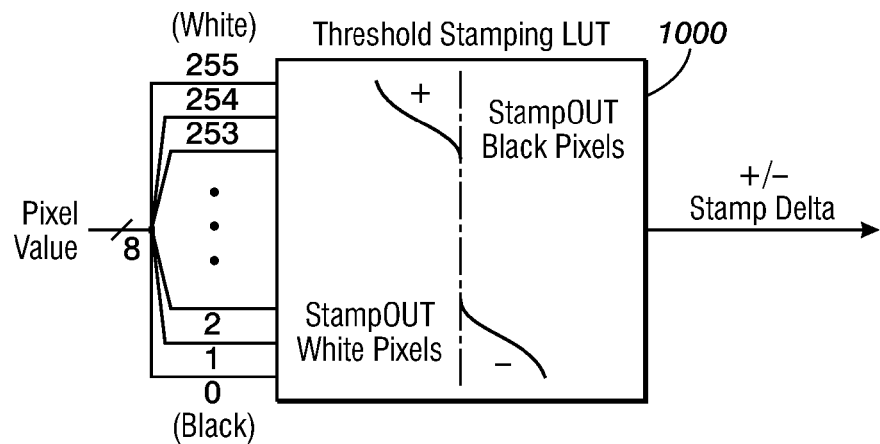
FIG. 10 depicts an exemplary fully programmable threshold delta look up table for a register stage according to an embodiment.

FIG. 10 depicts an exemplary fully programmable threshold delta look up table for a register stage according to an embodiment. As shown in FIG. 10, the LUT 1000 may store threshold delta value(s) 920 as a function of the input pixel value 910. For the LUT 1000, the entire input range may be completely programmable. Accordingly, a threshold delta value 920 may be assigned for any input pixel value 910. One disadvantage of the full programmable LUT 1000 may be that for intermediate levels, such as between about 16 and about 240, the threshold delta value 920 is set to, for example, 0. As such, a majority of the memory space may not affect the threshold value.

Figure 11:
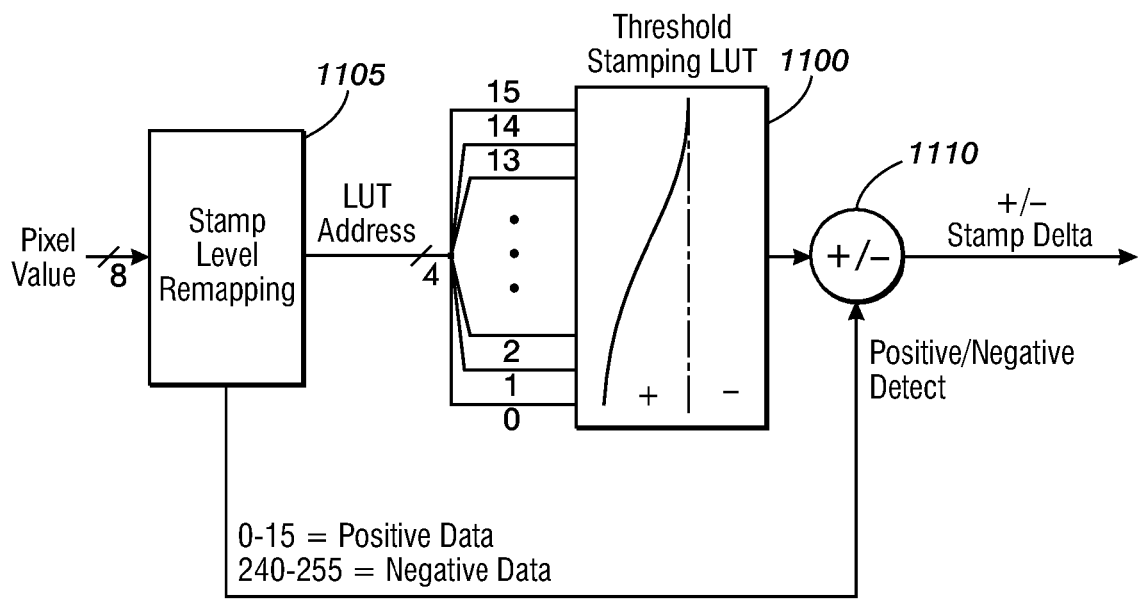
FIG. 11 depicts an exemplary reduced threshold delta look up table and associated logic for a register stage according to an embodiment.

FIG. 11 depicts an exemplary reduced threshold delta look up table and associated logic for a register stage according to an embodiment. The LUT 1100 may utilize the symmetrical nature of the stamping profile to reduce its size. In an embodiment, the sign for the threshold delta value 920 may be applied to the magnitude of the threshold delta value after retrieving the magnitude from the LUT 1100.

As shown in FIG. 11, the LUT 1100 may include, for example, 16 threshold delta value entries. The input pixel value 910 may be processed by stamp level remapping logic 1105. The stamp level remapping logic 1105 may determine whether the input pixel value 910 falls within one or more ranges, such as a first range from, for example, about 0 to about 15 or a second range from, for example, about 240 to about 255.

In an embodiment, if the input pixel value 910 falls within the first range, the stamp level remapping logic 1105 may direct a 2's complement conversion module 1110 to make the threshold delta value 920 negative by, for example, assigning a '1' to a sign bit. In an embodiment, if the input pixel value 910 falls within the second range, the stamp level remapping logic 1105 may direct the 2's complement conversion module 1110 to make the threshold delta value 920 positive by, for example, assigning a '0' to a sign bit.

In an embodiment, if the input pixel value 910 does not fall within either the first range or the second range, the threshold delta value 920 may be assigned a value of '0' (not shown). In an alternate embodiment, if the input pixel value 910 does not fall within either the first range or the second range, a signal (not shown) may be used to make multiplexer 930, as shown in FIG. 9, select the threshold value. In another alternate embodiment, if the input pixel value 910 does not fall within either the first range or the second range and a threshold delta value 920 in the LUT 1100 is equal to 0, the stamp level remapping logic 1105 may assign a LUT address equal to the location of that threshold delta value 920 and direct the 2's complement conversion module 1110 to make the threshold delta value 920 positive by, for example, assigning a '0' to a sign bit. Alternate and/or additional ranges are encompassed within the scope of this disclosure.

Referring back to FIG. 8, FF[−12] 805$y$ may output an updated threshold value (as determined, for example, by the threshold stamping operation performed in FF[+12] 805$a$ to FF[−12]), an updated error value (as determined, for example, by the error diffusion block 805$m$), and a binary pixel value 825 (as determined, for example, by the error diffusion block) for each color, such as cyan, magenta, yellow and black. The binary pixel value 825 may represent whether a particular pixel is light or dark. The updated threshold value may be passed to the threshold damping circuit 830.

In an embodiment, the threshold damping circuit 830 may multiply the updated threshold value by a fractional value, such as a value greater than 0 but less than 1, in order to reduce the effect on a particular pixel position for each subsequent scanline. In an alternate embodiment, the threshold damping circuit 830 may subtract a value from the absolute value of each updated threshold value. If the resulting value is less than zero, the threshold damping circuit 830 may set the value to 0. The damped threshold value and the error value may then be stored in the same memory location within the threshold scanline buffer memory 820 and the error scanline buffer memory 815, respectively, from which they were originally retrieved. The values may then be used, for example, in the computation of threshold and error values for the next scanline.

Figure 12:
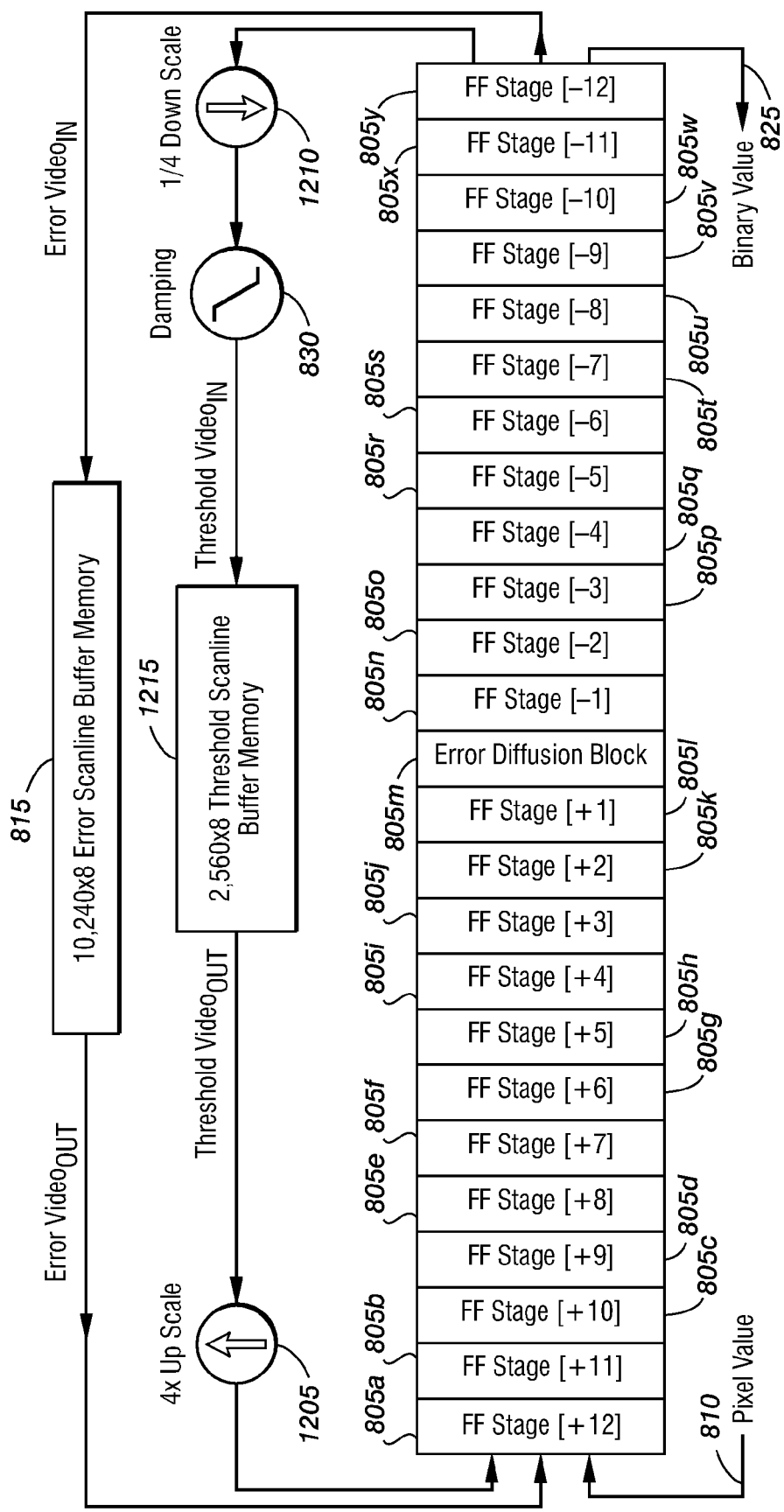
FIG. 12 depicts an exemplary block diagram having a reduced threshold scanline buffer memory according to an embodiment.

FIG. 12 depicts an exemplary block diagram having a reduced threshold scanline buffer memory according to an embodiment. The circuit of FIG. 12 may be substantially similar to that of FIG. 8 with the addition of threshold upscaling logic 1205 and threshold downscaling logic 1210 and a size reduction for the threshold scanline buffer memory 1215. In an embodiment, the threshold scanline buffer memory 1215 may be reduced in size by a scaling factor of, for example, four. In an embodiment, the threshold scanline buffer memory 1215 may be reduced by a scaling factor greater than or less than four and still be within the scope of this disclosure.

The following description pertains to a single instance of an error diffusion algorithm and a threshold stamping algorithm in the register array 805$a$-$y$. The operation for each of, for example, cyan, magenta, yellow and black error diffusion algorithms and threshold stamping algorithms may function substantially similar to the described embodiment using the pixel information for each of those colors. Other, additional, or fewer colors may be used within a particular embodiment and still be within the scope of this disclosure.

As shown in FIG. 12, a register array 805$a$-$y$ may be used to perform error diffusion and threshold sampling. In an embodiment, FF[+12] 805$a$ may receive a pixel value 810, which may be a value within a range from, for example, 0 to 255; an error value from the error scanline buffer memory 815, which may be a value within a range from, for example, −128 to 127; and a threshold value from the threshold scanline buffer memory 1215, which may be a value within a range from, for example, −128 to 127. The pixel value 810 may represent the pixel intensity of a corresponding pixel in an input image. The error value may represent the initial error assigned to the pixel according to an error diffusion method. The threshold value may represent a threshold value for the pixel based on preceding scanlines. Each of FF[+12, ..., −12] 805$a$-$y$ may perform the functions depicted in FIG. 9. In addition, FF[0] (or the error diffusion block) 805$m$ may perform the error diffusion algorithm for a particular pixel. The particular error diffusion algorithm performed by the error diffusion block 805$m$ may not affect the threshold computation described herein. The threshold value may be received from the threshold upscaling logic 1205, which is described in reference to FIG. 13A.

FF[−12] 805$y$ may output an updated threshold value (as determined, for example, by the threshold stamping operation performed in FF[+12] 805$a$ to FF[−12]), an updated error value (as determined, for example, by the error diffusion block 805$m$), and a binary pixel value 825 (as determined, for example, by the error diffusion block) for each color, such as cyan, magenta, yellow and black. The binary pixel value 825 may represent whether a particular pixel is light or dark. The updated threshold value may be passed to threshold downscaling logic 1210, which is described in reference to FIG. 13B.

In an embodiment, the downscaled threshold value may be passed to the threshold damping circuit 830. In an embodiment, the threshold damping circuit 830 may multiply the updated threshold value by a value, such as a value between about 0 and about 1. In an alternate embodiment, the threshold damping circuit 830 may subtract a value from the absolute value of each updated threshold value. If the resulting value is less than zero, the threshold damping circuit 830 may set the value to 0. The damped threshold value may reduce the effect of the threshold delta value on a particular pixel position for each subsequent scanline.

In an alternate embodiment, the threshold downscaling logic 1210 and the threshold damping circuit 830 may be combined into one circuit to reduce delay in computing the damped threshold value.

The damped threshold value and the error value may then be stored in the same memory location within the threshold scanline buffer memory 1215 and the error scanline buffer memory 815, respectively, from which they were originally retrieved. The values may then be used, for example, in the computation of the threshold and error values for the next scanline.

Figure 13A:
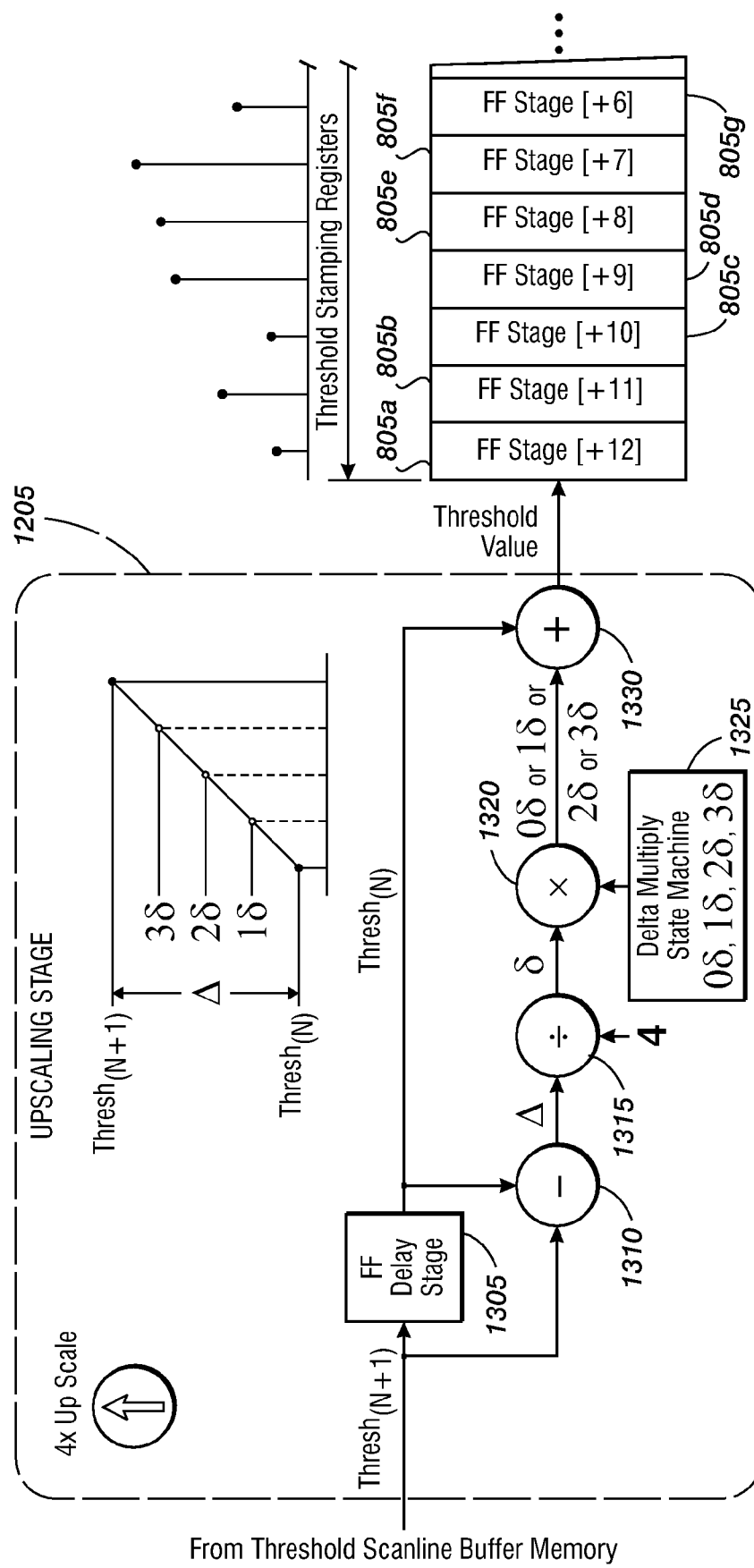
FIG. 13A depicts an exemplary upscaling logic diagram according to an embodiment.

FIG. 13A depicts an exemplary upscaling logic diagram according to an embodiment. The threshold upscaling logic 1205 may use linear interpolation to generate additional threshold values based on the received threshold value from the threshold scanline buffer memory 1215 prior to sending the threshold values to FF[+12] 805$a$ in order to maintain a consistent resolution relative to the pixel video. As shown in FIG. 13A, the threshold upscaling logic 1205 may include a register 1305, a subtractor circuit 1310, a divider circuit 1315, a multiplier circuit 1320, a state machine 1325 and an adder circuit 1330.

In an embodiment, the register 1305 may be used to determine the threshold value stored in memory location N and memory location N+1. The number of register array clock cycles for which the register 1305 maintains a threshold value may depend upon the scaling factor for the threshold upscaling logic 1205. The scaling factor may correspond to the size reduction of the threshold scanline buffer memory 1215. For example, if the scaling factor is four, the register 1305 may maintain its value for four register array clock cycles. Alternate scaling factors are also encompassed within the scope of this disclosure.

The subtractor circuit 1310 may compute the difference between the threshold value stored in memory location N and the threshold value stored in memory location N+1. This may be termed the delta value (Δ) between the two threshold values. The divider circuit 1315 may then be used to divide Δ by the scaling factor (e.g., four) to determine an interpolation factor (δ). The state machine 1325 may cycle through the numbers 0, 1, 2 and 3 as constants to be used by the multiplier circuit 1320 in computing products with δ. In an embodiment, the number 0 may be used in the cycle in which the register 1305 accepts a new threshold value. The output of the multiplier circuit 1320 may be the values {0, δ, 2δ, 3δ} in four consecutive clock cycles for the register array 805*a-y*. Similarly, the adder circuit 1330 may output the values {Thresh$_N$, Thresh$_N$+δ, Thresh$_N$+2δ, Thresh$_N$+3δ} to FF[+12] 805*a* in four consecutive register array clock cycles. In this manner, the threshold upscaling circuit may send four threshold values to FF[+12] 805*a* with only one access of the threshold scanline buffer memory 1215.

Figure 13B:
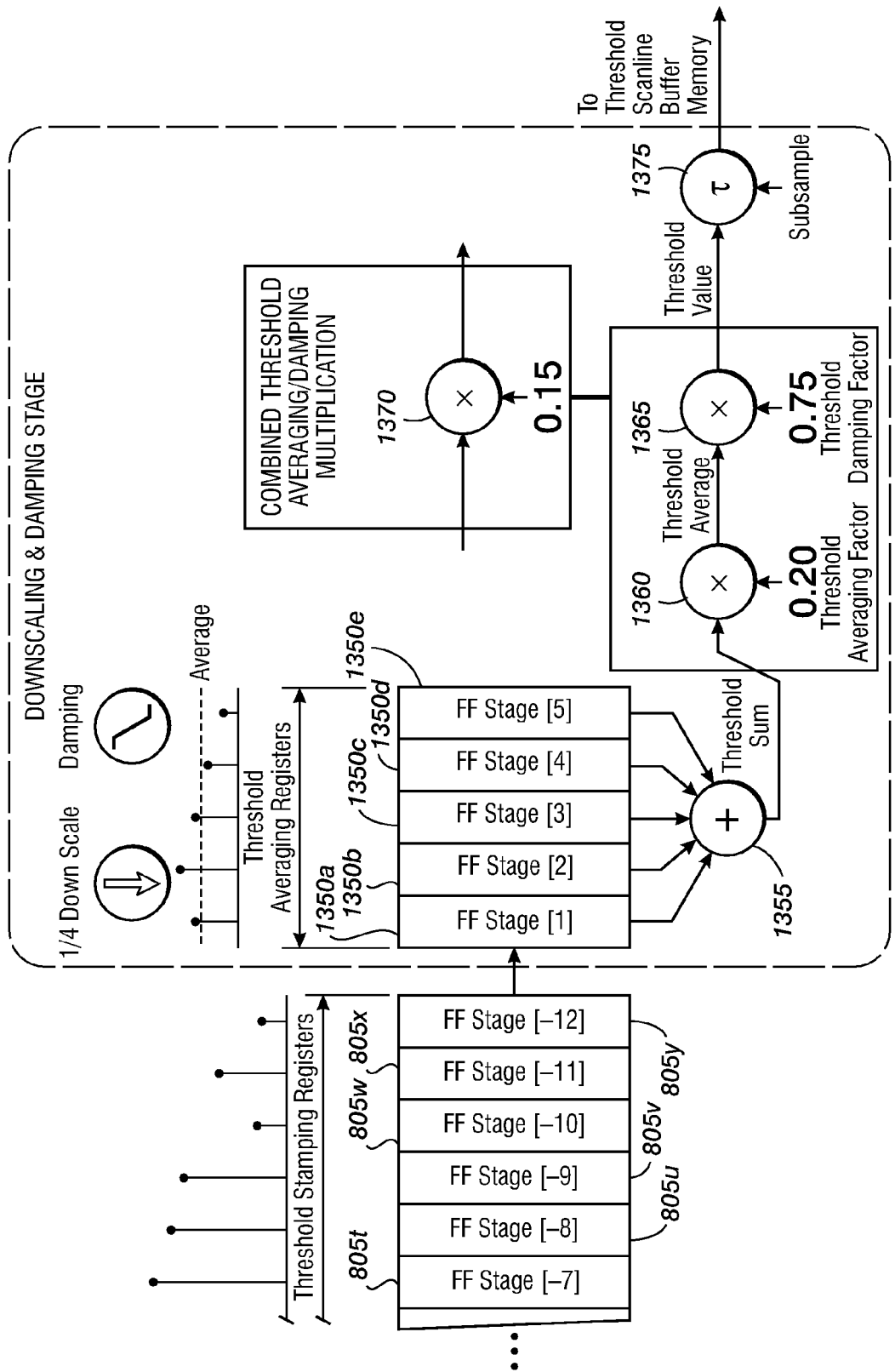
FIG. 13B depicts an exemplary downscaling logic diagram according to an embodiment.

FIG. 13B depicts an exemplary downscaling logic diagram according to an embodiment. As shown in FIG. 13B, the threshold downscaling logic 1210 may be combined with the threshold damping circuit 830 and may include, for example, five threshold averaging registers 1350*a-e*, an adder circuit 1355, a threshold averaging multiplier 1360, a threshold damping multiplier 1365 and a sampling circuit 1375. In an embodiment, the threshold averaging multiplier 1360 and the threshold damping multiplier 1365 may be combined into a single threshold averaging/damping multiplier 1370. In an embodiment, the number of threshold averaging registers 1350 may be equal to the scaling factor plus one.

The threshold downscaling logic 1210 may receive updated threshold values from FF[−12] 805*y*. The threshold downscaling logic 1210 may sum the last (scaling factor+1) updated threshold values, stored in the registers 1350*a-e*, using the adder circuit 1355. The average value may then be determined by multiplying the sum by an averaging factor using the threshold averaging multiplier 1360. In an embodiment, the averaging factor may equal $$\frac{1}{\text{scaling factor}+1}.$$

In an embodiment, the threshold downscaling logic 1210 may multiply the output of the threshold average multiplier 1360 by a damping factor for the threshold damping multiplier 1365. In an alternate embodiment, the averaging factor and the damping factor may be combined. This may result in a single multiply operation being performed using a threshold averaging/damping multiplier 1370. The output of the multiplier logic may be sampled once every (scaling factor) clock cycles for the register array 805*a-y* by the sampling circuit 1375.

In an alternate embodiment, the threshold averaging multiplier 1360, the threshold damping multiplier 1365 and/or the threshold averaging/damping multiplier 1370 may be accessed after the sampling circuit 1375 has sampled a value.

In an embodiment, the threshold upscaling logic 1205 and the threshold downscaling logic 1210 may be synchronized to retrieve and store threshold values for the same pixel in the threshold scanline buffer memory 1215.

Figure 6A:
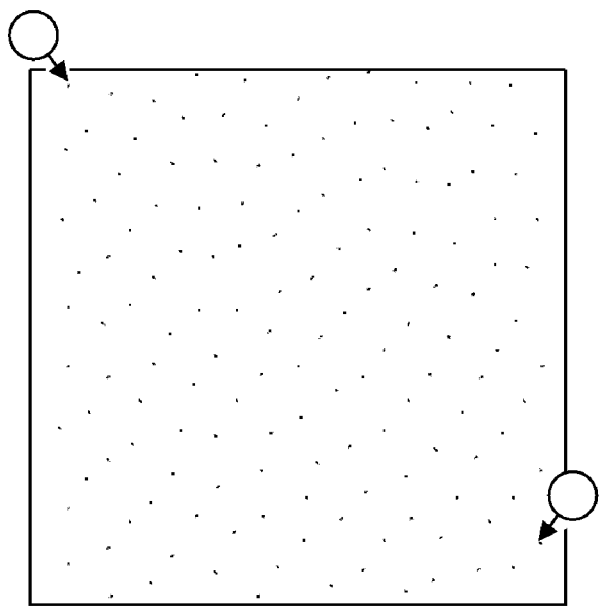
FIG. 6A depicts an error diffusion rendered binary image using threshold stamping.
Figure 6B:
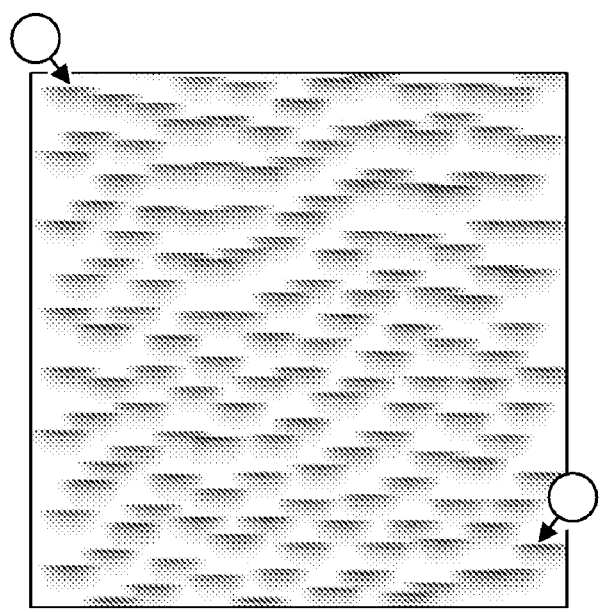
FIG. 6B depicts an error diffusion threshold delta image.
Figure 14A:
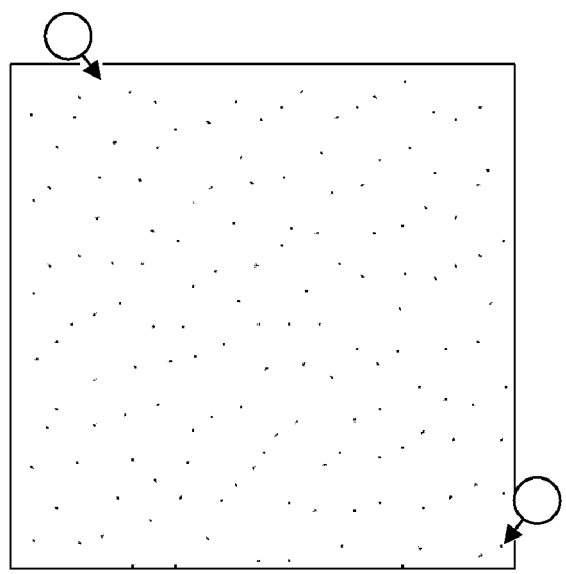
FIG. 14A depicts an exemplary error diffusion rendered binary image using threshold stamping.
Figure 14B:
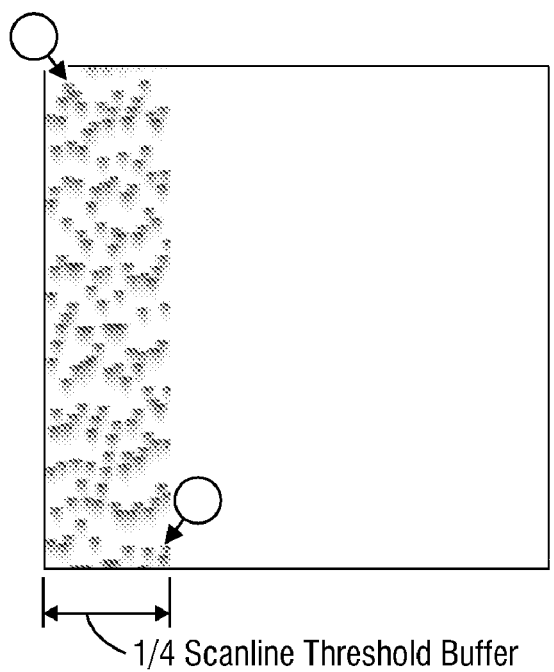
FIG. 14B depicts an exemplary error diffusion threshold delta image with one-quarter line-buffer utilization according to an embodiment.

FIG. 14A depicts an exemplary error diffusion rendered binary image using threshold stamping. FIG. 14B depicts an exemplary error diffusion threshold delta image with one-quarter line-buffer utilization according to an embodiment. The location and magnitude of the stamping profile in FIG. 14B may directly correlate to the location of the pixels in FIG. 14A. However, since the threshold scanline buffer memory 1215 only stores one-quarter of the data, the stamping profile in FIG. 14B may use only one-quarter of the memory of a non-reduced stamping profile, such as in FIG. 6B.

Figure 15:
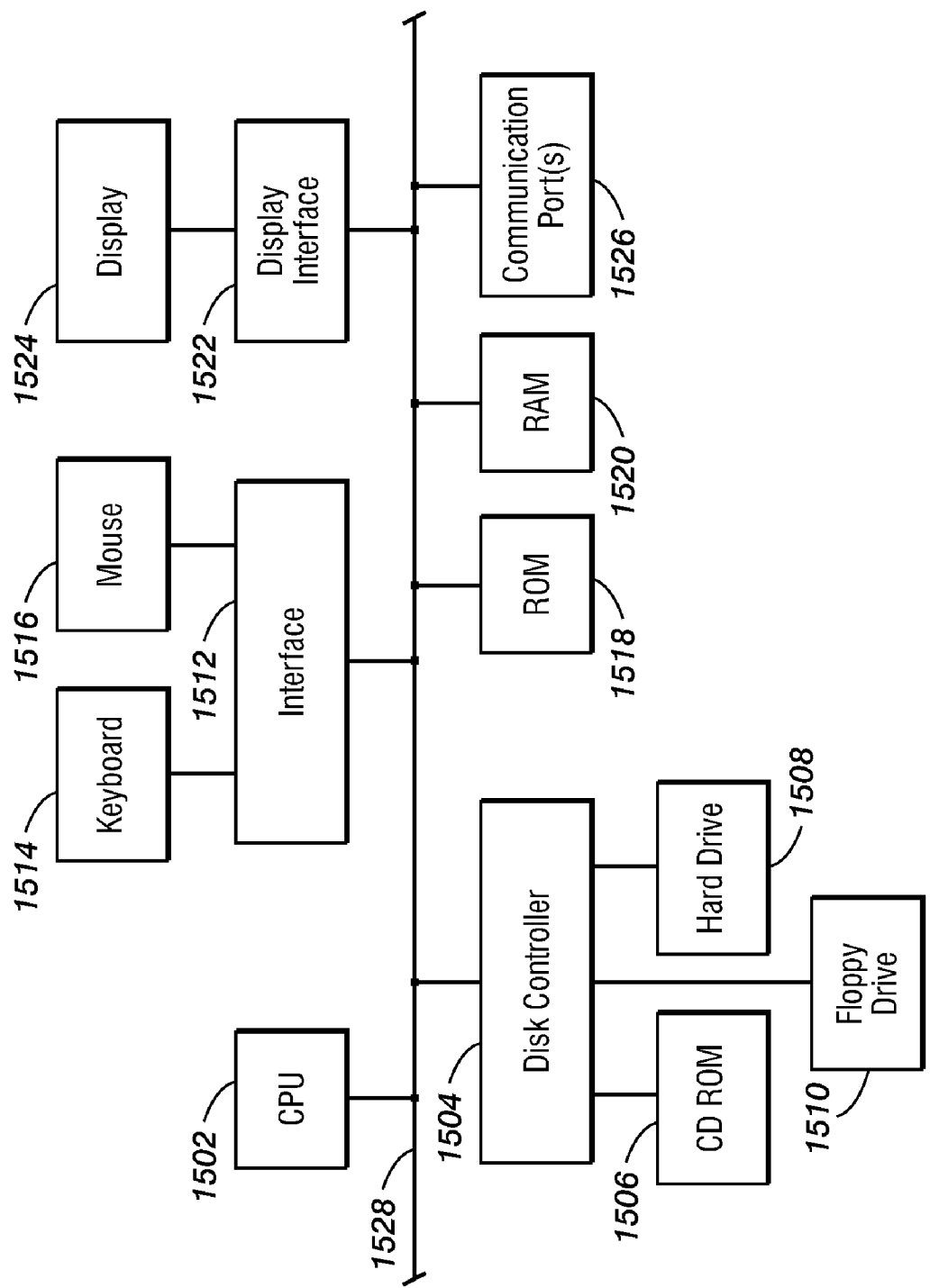
FIG. 15 is a block diagram of exemplary internal hardware that may be used to contain or implement the program instructions according to an embodiment.

FIG. 15 is a block diagram of exemplary internal hardware that may be used to contain or implement the program instructions according to an embodiment. Referring to FIG. 15, a bus 1528 may serve as a main information highway interconnecting the other illustrated components of the hardware. CPU 1502 is the central processing unit of the system, performing calculations and logic operations required to execute a program. Read only memory (ROM) 1518 and random access memory (RAM) 1520 constitute exemplary memory devices.

A disk controller 1504 interfaces with one or more optional disk drives to the system bus 1528. These disk drives may be external or internal floppy disk drives such as 1510, CD ROM drives 1506, or external or internal hard drives 1508. As indicated previously, these various disk drives and disk controllers are optional devices.

Program instructions may be stored in the ROM 1518 and/or the RAM 1520. Optionally, program instructions may be stored on a computer readable medium such as a floppy disk or a digital disk or other recording medium, a communications signal or a carrier wave.

An optional display interface 1522 may permit information from the bus 1528 to be displayed on the display 1524 in audio, graphic or alphanumeric format. Communication with external devices may optionally occur using various communication ports 1526. An exemplary communication port 1526 may be attached to a communications network, such as the Internet or an intranet.

In addition to computer-type components and their equivalents, the hardware may also include an interface 1512 which allows for receipt of data from input devices such as a keyboard 1514 or other input device 1516 such as a remote control, pointer and/or joystick.

A multiprocessor system may optionally be used to perform one, some or all of the operations described herein. Likewise, an embedded system, such as a sub-system within a xerographic apparatus, may optionally be used to perform one, some or all of the operations described herein.

For example, a xerographic apparatus may scan an image into, download an image in or otherwise receive an image in, for example, a digital format. The digital format may include one or more pixel values for each pixel in the image. The pixel values may be stored in a memory prior to processing or may be utilized for processing as the image is being scanned. The xerographic apparatus may use a method described above or an equivalent method to determine binary pixel values, error values and threshold values as each pixel is processed. Error values and threshold values may be written to the error and threshold scanline buffer memories, respectively, for the processing of subsequent scanlines. Upon completion of or during pixel processing, the resulting binary image may be transferred to, for example, a printing module of the xerographic apparatus, a printer, or any other device for generating a human-readable representation of the image.

It will be appreciated that various of the above-disclosed and other features and functions, or alternatives thereof may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for performing threshold stamping, the system comprising:

a threshold memory comprising a plurality of threshold values;

an error memory comprising a plurality of error values;

a register array, wherein the register array comprises a plurality of register blocks, wherein a first register block is in communication with the threshold memory and the error memory, wherein a second register block comprises an error diffusion block, wherein a third register block is in communication with the error memory, wherein the third register block outputs a stamped threshold value; and a threshold damping circuit, wherein the threshold damping circuit is in communication with the third register block and the threshold memory, wherein the threshold damping circuit reduces the stamped threshold value.

2. The system of claim 1 wherein the threshold damping circuit reduces the stamped threshold value by multiplying the stamped threshold value by a constant, wherein the constant is a value from about 0 to about 1.

3. The system of claim 1 wherein the threshold damping circuit reduces the stamped threshold value by subtracting a constant from the absolute value of the stamped threshold value to determine a damped threshold value, wherein if the computed damped threshold value is less than zero, the damped threshold value equals zero.

4. A computer-implemented method of performing threshold stamping, the method comprising:

retrieving, via a processor, a first threshold value corresponding to a first pixel and a second threshold value corresponding to a second pixel from a threshold memory;

calculating, via the processor, a plurality of upscaled threshold values based on the first threshold value and the second threshold value;

updating, at each of a plurality of register blocks, an upscaled threshold value;

computing, at an error diffusion block, a binary pixel value;

computing, via the processor, a downscaled threshold value based on a plurality of updated threshold values;

damping the downscaled threshold value; and storing, via the processor, the damped threshold value in the threshold memory.

5. The method of claim 4 wherein computing a binary pixel value comprises:

computing the binary pixel value based on at least the updated threshold value corresponding to a pixel, an error value corresponding to the pixel, and a pixel value corresponding to the pixel.

6. The method of claim 4 wherein downscaling the updated threshold value comprises:

computing a downscaled threshold value equal to the average of a plurality of updated threshold values.

7. The method of claim 4 wherein damping the updated threshold value comprises:

setting the damped threshold value to a product of the updated threshold value and a value, wherein the value is between about 0 and about 1.

8. The method of claim 4 wherein damping the updated threshold value comprises:

if a constant is less than the absolute value of the updated threshold value, setting the damped threshold value to a difference between the constant and the updated threshold value; and if not, setting the damped threshold value to zero.

* * * * *